(12) United States Patent
Busbridge et al.

(10) Patent No.: US 10,599,686 B1
(45) Date of Patent: Mar. 24, 2020

(54) METHOD AND SYSTEM FOR EXTRACTING INFORMATION FROM GRAPHS

(71) Applicant: Babylon Partners Limited, London (GB)

(72) Inventors: Daniel William Busbridge, London (GB); Pietro Cavallo, London (GB); Dane Grant Sherburn, London (GB); Nils Yannick Hammerla, London (GB)

(73) Assignee: Babylon Partners Limited, London (GB)

( * ) Notice: Subject to any disclaimer, the term of this patent is extended or adjusted under 35 U.S.C. 154(b) by 0 days.

(21) Appl. No.: 16/144,652

(22) Filed: Sep. 27, 2018

(51) Int. Cl.
*G06F 16/30* (2019.01)
*G06F 16/28* (2019.01)
*G06F 16/25* (2019.01)
*G06F 16/901* (2019.01)

(52) U.S. Cl.
CPC .......... *G06F 16/288* (2019.01); *G06F 16/258* (2019.01); *G06F 16/9024* (2019.01)

(58) Field of Classification Search
CPC ......... G06F 17/30604; G06F 17/30569; G06F 17/30958; G06F 16/288; G06F 16/258; G06F 16/9024
USPC ....................................................... 707/741
See application file for complete search history.

(56) References Cited

U.S. PATENT DOCUMENTS

| 9,715,495 | B1 | 7/2017 | Tacchi |
| 2014/0244335 | A1* | 8/2014 | Baldwin ........ G06Q 10/063118 705/7.17 |
| 2016/0080840 | A1 | 3/2016 | Haghighat-Kashani |
| 2017/0103143 | A1* | 4/2017 | Kumar .............. G06F 17/30917 |
| 2018/0232262 | A1* | 8/2018 | Chowdhury ........ G06F 17/3056 |
| 2018/0247224 | A1 | 8/2018 | Garcia Duran et al. |
| 2019/0080383 | A1 | 3/2019 | Garcia Duran |

OTHER PUBLICATIONS

Tran, H., et al., "Low Data Drug Discovery with One-Shot Learning", ACS Publications, ACS Cent. Sci. 2017, 3, pp. 283-293.
Tran, H., et al., "Low Data Drug Discovery with One-Shot Learning", Dept. of Biological engineering, MIT, Dept. of Computer Science, Standord University, and Dept. of Chemistry, Stanford University, 20 pages.
Atwood, J., et al., "Diffusion-Convolutional Neural Networks", 29th Conference on Neural Information Processing Systems (NIPS 2016), Barcelona, Spain, 9 pages.

(Continued)

*Primary Examiner* — Joshua Bullock
(74) *Attorney, Agent, or Firm* — McDermott Will & Emery LLP

(57) ABSTRACT

A method of mapping a first graphical data structure representation to a second graphical data structure representation, the first graphical data structure representation comprising nodes, with at least one of a plurality of relations between said nodes, the second graphical data structure representation comprising nodes, the mapping comprises using an attention mechanism, wherein said attention mechanism establishes the importance of specific nodes dependent on their neighbourhood and the relations between the nodes.

14 Claims, 5 Drawing Sheets

(56) References Cited

OTHER PUBLICATIONS

Boscaini, D., et al., "Learning Shape correspondence with Anisotropic Convolutional Neural Networks", 30th Conference on Neural Information Processing Systems (NPIS 2016), Barcelona, Spain, 9 pages.
Bronstein, M., "Geometric Deep Learning: Going Beyond Euclidean Data", IEEE Sig Proc Mag, May 2017, pp. 1-22.
Bruna, J., et al., "Spectral Networks and Deep Locally Connected Networks on Graphs", arXiv:1312.6203v3 [cs.LG] May 21, 2014, 14 pages.
Dirk de Vries, G., et al., "Substructure counting graph kernels for machine learning from RDF data", Web Semantics: Science, Services and Agents on the World Wide Web 35 (2015) 71-84.
Defferrard, M., "Convolutional Neural Networks on Graphs with Fast Localized Spectral Filtering", 30th Conference on Neural Information Processing Systems (NPIS 2016), Barcelona, Spain, 9 pages.
Donahue, J., et al., "Long-Term Recurrent Convolutional Networks for Visual Recognition and Description", IEEE Transactions on Pattern Analysis and Machine Intelligence, vol. 39, No. 4., Apr. 2017.
Duvenaud, D., "Convolutional Networks on Graphs for Learning Molecular Fingerprints", arXuv:1509.09292v2 [cs.LG], Nov. 3, 2015, 9 pages.
Feinberg, E., et al., "PotentialNet for Molecular Property Prediction", arXiv:1803.04465v2 [cs.LG] Oct. 22, 2018, https://www.researchgate.net/publication/323746996, 13 pages.
Gavish, M., et al., "Multiscale Wavelets on Trees, Graphs and High Dimensional Data: Theory and Applications to Semi Supervised Learning", http://citeseerx.ist.psu.edu/summary?doi=10.1.1.170.967, 8 pages.
Henaff, M., et al., "Deep Convolutional Networks on Graph-Structured Data", arXiv:1506.05163v1 [cs.LG], Jun. 16, 2015, 10 pages.
Karpathy, A., et al., "Large-scale Video Classification with Convultional Neural Networks", https://cs.standord.edu/people/karpathy/deepvideo, 2014, 8 pages.
Kearnes, S., et al., "Molecular Graph Convolutions: Moving Beyond Fingerprints", J. Comput. Aided Mol Des (2016) 30: 595-608, DOI 10.1007/s10822-016-9938-8.
Kingma, D., et al., "ADAM: A Method for Stochastic Optimization", ICLR 2015, arXiv:1412.6980v9 [cs.LG] Jan. 30, 2017, 15 pages.
Kipf, T., "Semi-Supervised Classification with Graph Convolutional Networks", ICLR 2017, arXiv:1609.02907v4 [cs.LG] Feb. 22, 2017, 14 pages.
Lee, J., et al., "Attention Models in Graphs: A Survey", arXiv.1807.097984v1 [cs.Al] Jul. 20, 2018, 19 pages.
Masci, J., et al., "Geodesic convolutional neural networks on Riemannian manifolds", arXiv:1501.06297v3 [cs.CV] Jun. 8, 2018, 9 pages.
Monti, F., et al., "Geometric deep learning on graphs and manifolds using mixture model CNNs", Computer Vision Foundation, 2017, 10 pages.
Paulheim, H., et al., "Unsupervised Generation of Data Mining Features from Linked Open Data", Technical Report TUD-KE-2011-2, Version 1.0, Nov. 4, 2011, 26 pages.
Ramsundar, B., et al., "Massively Multitask Networks for Drug Discovery", arXiv:1502.02072v1 [stat.ML], Feb. 6, 2015, 27 pages.
Ristoski, P., "RDF2Vec: RDF Graph Embeddings for Data Mining", Sep. 23, 2016, https://madoc.bib.uni-mannheim.de/41307/1/Ristoski_RDF2Vec.pdf, 16 pages.
Rustamov, R., et al., "Wavelets on Graphs via Deep Learning", 2013, Neural Information Processing Systems, 9 pages.
Schlichtkrull, M., "Modeling Relational Data with Graph Convolutional Networks", arXiv:1703.06103v4 [stat.ML] Oct. 26, 2017, 9 pages.
Segler, M., et al., "Planning Chemical Syntheses with Deep Neural Networks and Symbolic AI", Nature, vol. 555, Mar. 29, 2018, pp. 604-619.
Shervashidze, N., et al., "Weisfeiler-Lehman Graph Kernels",Journal of Machine Learning Research 12 (2011) 2539-2561.
Shuman, D., et al., "Vertex-Frequency Analysis on Graphs", arXiv:1307.5708v1 [math.FA] Jul. 22, 2013, 31 pages.
Shuman, D., et al., "Vertex-Frequency Analysis on Graphs", Appl. Comput. Harmon. Anal. 40 (2016) 260-291.
Szlam, A., et al., "Diffusion-driven Multiscale Analysis on Manifolds and Graphs: top-down and bottom-up constructions", vol. 5914, SPIE (2005), 11 pages.
Thekumparampil, K., et al., "Attention-based Graph Neural Network for Semi-supervised Learning", arXiv:1803.03735v1 [stat.ML], Mar. 10, 2018, 15 pages.
Toshev, A. "DeepPose: Human Pose Estimation via Deep Neural Networks", 2014 IEEE Conference on Computer Vision and Pattern Recognition, pp. 1653-1660.
Vaswani, A., et al., "Attention Is All You Need", 31st Conference on Neural Information Processing Systems (NIPS 2017), pp. 1-15.
Velickovic, P., et al., "Graph Attention Networks", ICLR 2018, pp. 1-12.
Wu, z., et al., "MoleculeNet: a benchmark for molecular machine learning", Chem. Sci., 2018, 9, pp. 513-530.
Paulheim, H., et al., "Unsupervised Generation of Data Mining Features from Linked Open Data", WIMS '12, Jun. 13-15, 2012, 12 pages.

* cited by examiner

METHOD AND SYSTEM FOR EXTRACTING INFORMATION FROM GRAPHS

FIELD

Embodiments described herein are concerned with methods and systems for generating a new type of data structure derived from existing multi-relational graphs.

BACKGROUND

Data in the real world are often found in the form of graphs: a mathematical structure where pairs of objects are linked by a relation. For example, a pair of objects could be "Peter" and "UK", these two objects are linked by a relation that could define "lives in" or "was born in" etc.

Some examples of such graphical data structures include social networks, gene expression networks, and knowledge graphs. Even domains where data are not intuitively seen as graph-structured can sometimes be represented as graphs.

BRIEF DESCRIPTION OF THE FIGURES

FIG. 5(*b*) is a is a schematic of a layer architecture in accordance with an embodiment for graph classification.

DETAILED DESCRIPTION

Figure 1:
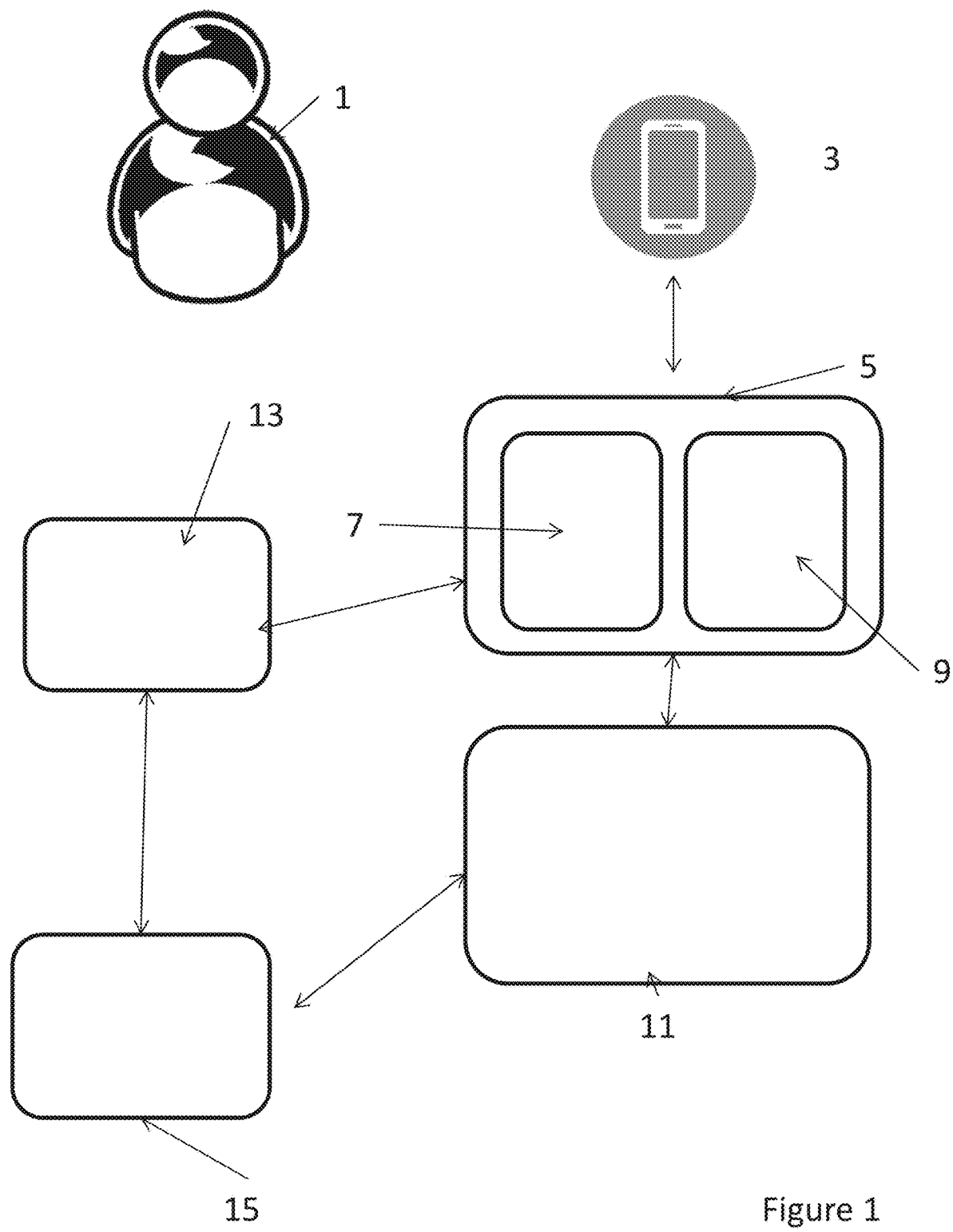
FIG. 1 is a schematic of a system in accordance with an embodiment.

In an embodiment, a computer implemented method of mapping a first graphical representation to a second graphical representation is provided, the first graphical representation comprising nodes, with at least one of a plurality of relations between said nodes, the second graphical representation comprising nodes, the mapping comprises using an attention mechanism, wherein said attention mechanism establishes the importance of specific nodes dependent on their neighbourhood and the relations between the nodes.

The disclosed system provides an improvement to computer functionality by allowing computer performance of a function not previously performed by a computer. Specifically, the disclosed system provides for processing a data structure in the form of a graph to produce a new data structure using a relation aware attention mechanism. An attention mechanism allows a neural network to dynamically allocate importance to different pieces of information. In the context of graphs, this means the importance of features of nodes within neighbourhoods. This has implications in fields such as predicting the properties of molecules, natural language processing, classification both of nodes and entire graphs. The disclosed system addresses this problem by determining the parameters of the attention mechanism with respect to the relations of a multi-relational graph.

The disclosed system also addresses a technical problem tied to computer technology, namely the technical problem of inefficient use of processor capacity since the system can allow a new data structure to be produced that allows more efficient processing of the data and reduction in required memory. Attention mechanisms allow dynamic allocation of importance to different pieces of information. The disclosed system provides an attention mechanism over a multi-relational graph. This allows a more compact representation of the data structure, thus saving memory, which in turn can provide more efficient processing due to the reduction of the data.

In summary, much information is stored in the form of graphical data structures or can be converted into graphical data structures. Extracting information from such graphs can require significant computing resources such as processor capacity. The disclosed systems and methods solve this technical problem with a technical solution, namely by using an attention mechanism to establish the importance of specific nodes of a graph dependent on their neighbourhood and the relations between the nodes. The use of an attention mechanism allows information from a graph to be extracted in an efficient manner. Also, it can be used to change the representation of the information into a form such that it can be used as an input to further systems, for example, a medical inference engine, query system or chatbot.

The above embodiment can be used for analysis of molecular structure, NLP, traffic forecasting, anomaly detection in time series, probabilistic inference, matrix completion, and static code checking.

Examples of a possible first graphical representation are graphical representations derived from semantic role labelling or other labelling of text and the second graphical representation could be a better form of the first graphical representation for a specific task, for example, the second graphical representation of be representation of the initial phrase in a more suitable form for a query database. In other embodiments, the second graphical form may comprise classification information to allow the first graphical representation itself components the first graphical representation to be classified.

In yet further embodiments, the feature vectors of the second graphical representation may be reduced in size from the feature vectors of the first graphical representation. Thus allowing a data structure to be produced that requires less memory space and that is more focussed towards the important features for the task.

In some tasks, for example, where the node in an input layer is required to correspond to a node in the output layer, the number of nodes in the input and output layers will match. However, in other embodiments, the number of nodes in the input output layers may differ and one may be larger than the other.

In an embodiment, a neural net is capable of handling different types of relations between the nodes and also uses an attention mechanism. Any neural network will have an input layer of nodes. In general, an attention mechanism allows a neural network to dynamically allocate importance to different pieces of information. In the context of graphs, this means the importance of features of nodes within neighbourhoods.

The neural net described here is an extension of a so called Graph Convolutional Network (GCN). In its simplest form a GCN is a machine learning model for graph structures with a single relation type the nodes have some features. This enables tractable, deterministic neural networks on graphs to be realised.

Relational Graph Convolutional Networks (RGCNs) extend GCNs to be aware of different relation types by enabling a relation-type aware graph propagation rule. This enables tractable, deterministic neural networks on graphs with multiple edge (relation) types.

Graph Attention Networks (GATs) extend GCNs with an attention mechanism, updating the graph propagation rule from a uniform aggregation of neighbourhood features to an attention mechanism which performs a node-feature dependent importance weighted aggregation of neighbourhood features.

In the systems described herein, a new type of Relational Graph Attention Networks (RGATs) is developed that extends Graph Attention Networks to multi-relational graphs.

An RGCN basically produces one GCN for each relation type and them sums them at the end. A GAT introduce a mechanism using attention coefficients a into a GCN. However, if these are combined, the attention coefficients across relationship types don't know about each other, and are effectively decoupled.

Thus, in an embodiment, the attention mechanism is enacted by attention coefficients and there is a coupling between attention coefficients across different relations.

This can be achieved in a number of different ways. In one embodiment, the attention mechanism is enacted by attention coefficients and the attention coefficients across a neighbourhood of nodes sum to one or are otherwise normalised.

In a further embodiment, the attention mechanism is enacted by attention coefficients and the attention coefficients across a neighbourhood of nodes for one or each relation sum to one or are otherwise normalised.

Thus, the embodiments described herein formulate the attention coefficients that could be different for each relation type and for each edge, such that the node neighbourhood sum over all attention coefficients was 1. This allows the relations to interact (from an attention point of view), and allows visibility of how the network treats different relation types as more important than others (by looking at the attention coefficients).

To achieve this, in an embodiment, a way of formulating the attention coefficients that could be different for each relation type and for each edge, such that the node neighbourhood sum over all attention coefficients was 1 was derived. In this embodiment, the propagation rule of the model is relation specific, and the attention coefficients are computed according to each neighbour's feature.

In an embodiment, the model described herein is applied to common relational graph datasets. The embodiments described herein present a new model that can be applied to arbitrary relational graphs, the RGATs. In particular, two ways of aggregating attention over the neighbourhood of a node are discussed, namely Within-Relation Graph Attention, where attention is calculated across each relation individually, and Across-Relation Graph Attention, where attention is calculated across all relations in the graph.

In an embodiment, the nodes of the first graphical representation each comprise a feature vector and the nodes of the second representation also each comprise a feature vector, the mapping converting the features of the feature vectors of the first graphical representation into transformed feature vectors of the second graphical representation.

The feature vectors of the first graphical representation are transformed into feature vectors of the second graphical representation via a linear transformation and an attention mechanism. The linear transformation may or may not form part of the attention mechanism.

In an embodiment, the attention mechanism assumes that after the linear transformation, the relation between the linearly transformed feature vectors are independent of other relations. This reduces the complexity of the process.

In a further embodiment, the attention mechanism comprises attention coefficients derived from a product of a relation dependent vector with a concatenation of two related nodes where the feature vectors from the two related nodes have been transformed via said linear transformation. Here, the attention coefficients are derived from the said product using an activation function that allows normalisation over the neighbourhood of nodes.

In further embodiments, a multi-head attention mechanism is provided. The attention mechanism itself is responsible for assigning node importance within neighbourhoods for the RGAT mechanism. Each attention mechanism is limited to identifying one type of important piece of information from any node, however, in an a graph, there may be more than one type of information flow required to solve the task. In multi-head attention mechanisms multiple attention mechanisms (with associated coefficients) are introduced into a single layer. These multiple mechanisms are called the heads of a multi-head attention mechanism. These heads are vector-concatenated to form the output of a single RGAT layer, so the next processing step (if there is one) has access to the outputs of each of the attention mechanisms inside the RGAT layer.

The matrices that define the linear transformation and the attention mechanism may be decomposed to reduce the number of parameters In a further embodiment, a natural language processing method is provided, adapted to map an input phrase into a form more suitable for a query, the method comprising:

converting the input phrase into a first graphical representation, wherein the words of the input phrase are converted into feature vectors and the semantic relationships between the words provide a plurality of relations between the feature vectors;

mapping said first graphical representation into a second graphical representation wherein the mapping comprises using an attention mechanism, said attention mechanism establishes the importance of specific feature vectors dependent on their neighbourhood and the relations between the feature vectors.

In the above embodiment, the relations can be derived from semantic labels. By using the above embodiment, a relational graph derived from semantic role labelling (SRL) can be used as an input to a diagnostic engine or chat bot. Currently, such information contained in such a graph is practically being discarded as user inputs are read sequentially, word by word. Thus, machine learning systems lose the linguistic prior knowledge encoded in those graphs. Being able to harness this information should lead to a significant increase in performance as a result of using RGAT in combination with SRL (and other methods that produce graphs).

In a further embodiment, a computer implemented classification method, for classifying entities is provided, said entities being defined by feature vectors and having relations between the entities, the method comprising:

representing the feature vectors and relations as a first graphical representation, mapping said first graphical representation into a second graphical representation wherein the mapping comprises using an attention mechanism, said attention mechanism establishes the importance of specific feature vectors dependent on their neighbourhood and the relations between the feature vectors, said mapping transforming the feature vectors of the first graphical representation to transformed feature vectors in the second graphical representation wherein the transformed feature vectors of said second graphical representation represent classes.

In a further embodiment, a computer implemented graphical classification method is provided, for classifying graphical structures, said graphical structures being comprising nodes defined by feature vectors and having relations between the nodes, the method comprising:

representing the feature vectors and relations as a first graphical representation, mapping said first graphical representation into a second graphical representation wherein the mapping comprises using an attention mechanism, said attention mechanism establishes the importance of specific feature vectors dependent on their neighbourhood and the relations between the feature vectors, said mapping transforming the feature vectors of the first graphical representation to transformed feature vectors in the second graphical representation;

combining the transformed feature vectors to obtain a third combined representation said third combined representation being an indication of the classification of the graphical structure.

In the above embodiment, the third combined transformation derived from all of the transformed feature vectors allows a single representation for the entire first graphical structure.

In a further embodiment, a computer implemented graphical classification method is provided, said graphical structures being comprising nodes defined by feature vectors and having relations between the nodes, the method comprising:

representing the feature vectors and relations as a first graphical representation, mapping said first graphical representation into a second graphical representation wherein the mapping comprises using an attention mechanism, said attention mechanism establishes the importance of specific feature vectors dependent on their neighbourhood and the relations between the feature vectors, said mapping transforming the feature vectors of the first graphical representation to transformed feature vectors in the second graphical representation;

combining the transformed feature vectors to obtain a third combined representation; and mapping said third combined representation to a feature vector indicating properties of the graphical structure.

In the above embodiment the combined third representation that represents the entire graph is then put through further mapping to indicate properties of the entire structure. For example, where the first graphical structure represents a molecule, the third representation can provide a vector that represents the whole molecule that can then be further mapped to determine properties of the molecule.

Thus, in a further embodiment, a computer implemented method is provided, for classifying molecular structures, said method comprising:

representing the elements, atoms etc in a molecular structure as nodes and the bonds as relations as a first graphical representation;

mapping said first graphical representation into a second graphical representation wherein the mapping comprises using an attention mechanism, said attention mechanism establishes the importance of specific feature vectors dependent on their neighbourhood and the relations between the feature vectors, said mapping transforming the feature vectors of the first graphical representation to transformed feature vectors in the second graphical representation;

combining the transformed feature vectors to obtain a third combined representation; and mapping said third combined representation to a feature vector indicating properties of the molecular structure.

Thus, the elements in a molecular structure are represented as nodes whose features are their corresponding atomic properties, and relations whose between the nodes corresponding to the bonds in the molecular structure and the bonds as relations, as a first graphical representation;

representing the elements in a molecular structure as nodes whose features are their corresponding atomic properties, and relations whose between the nodes corresponding to the bonds in the molecular structure and the bonds as relations, as a first graphical representation;

Training may be performed for any of the mappings. For example, such a training method may comprise:

receiving a data set comprising an output layer and a corresponding input layer, training the parameters of a neural net, said neural net being configured with the above described attention mechanism wherein the training is performed to minimise errors.

Where the RGAT layer forms part of a larger network, the RGAT parameters can be trained jointly with the parameters from other layers. The RGAT parameters comprising W and α as described below.

In a further embodiment, a system is provided for mapping a first graphical representation to a second graphical representation, the system comprising a processor and a memory, the processor being configured to:

receive a first graphical representation comprising nodes, with at least one of a plurality of relations between said nodes, retrieve from memory a pre-trained model adapted to map said first graphical representation to a second graphical representation, wherein the pre-trained model uses an attention mechanism, wherein said attention mechanism establishes the importance of specific nodes dependent on their neighbourhood and the relations between the nodes; and map the first graphical representation to a the second graphical representation.

FIG. 1 is a schematic of a diagnostic system. In one embodiment, a user 1 communicates with the system via a mobile phone 3. However, any device could be used, which is capable of communicating information over a computer network, for example, a laptop, tablet computer, information point, fixed computer etc.

The mobile phone 3 will communicate with interface 5. Interface 5 has 2 primary functions, the first function 7 is to take the words uttered by the user and turn them into a form that can be understood by an inference engine 11. The second function 9 is to take the output of the inference engine 11 and to send this back to the users mobile phone 3.

In some embodiments, Natural Language Processing (NLP) is used in the interface 5. NLP helps computers interpret, understand, and then use everyday human language and language patterns. It breaks both speech and text down into shorter components and interprets these more manageable blocks to understand what each individual component means and how it contributes to the overall meaning, linking the occurrence of medical terms to the Knowledge Graph. Through NLP it is possible to transcribe consultations, summarise clinical records and chat with users in a more natural, human way.

However, simply understanding how users express their symptoms and risk factors is not enough to identify and provide reasons about the underlying set of diseases. For this, the inference engine 11 is used. The inference engine is a powerful set of machine learning systems, capable of reasoning on a space of >100 s of billions of combinations of symptoms, diseases and risk factors, per second, to suggest possible underlying conditions. The inference engine can provide reasoning efficiently, at scale, to bring healthcare to millions.

In an embodiment, the Knowledge Graph 13 is a large structured medical knowledge base. It captures human knowledge on modern medicine encoded for machines. This is used to allow the above components to speak to each other. The Knowledge Graph keeps track of the meaning behind medical terminology across different medical systems and different languages. When producing an answer to a query made by a user, the inference engine 11 calls on data saved concerning the user 15. This is then passed back through the interface 5.

The systems and methods described herein have many extensions outside the system of FIG. 1. However, the basic principles will now be described in relation to an example based on the structure of FIG. 1.

Figure 2:
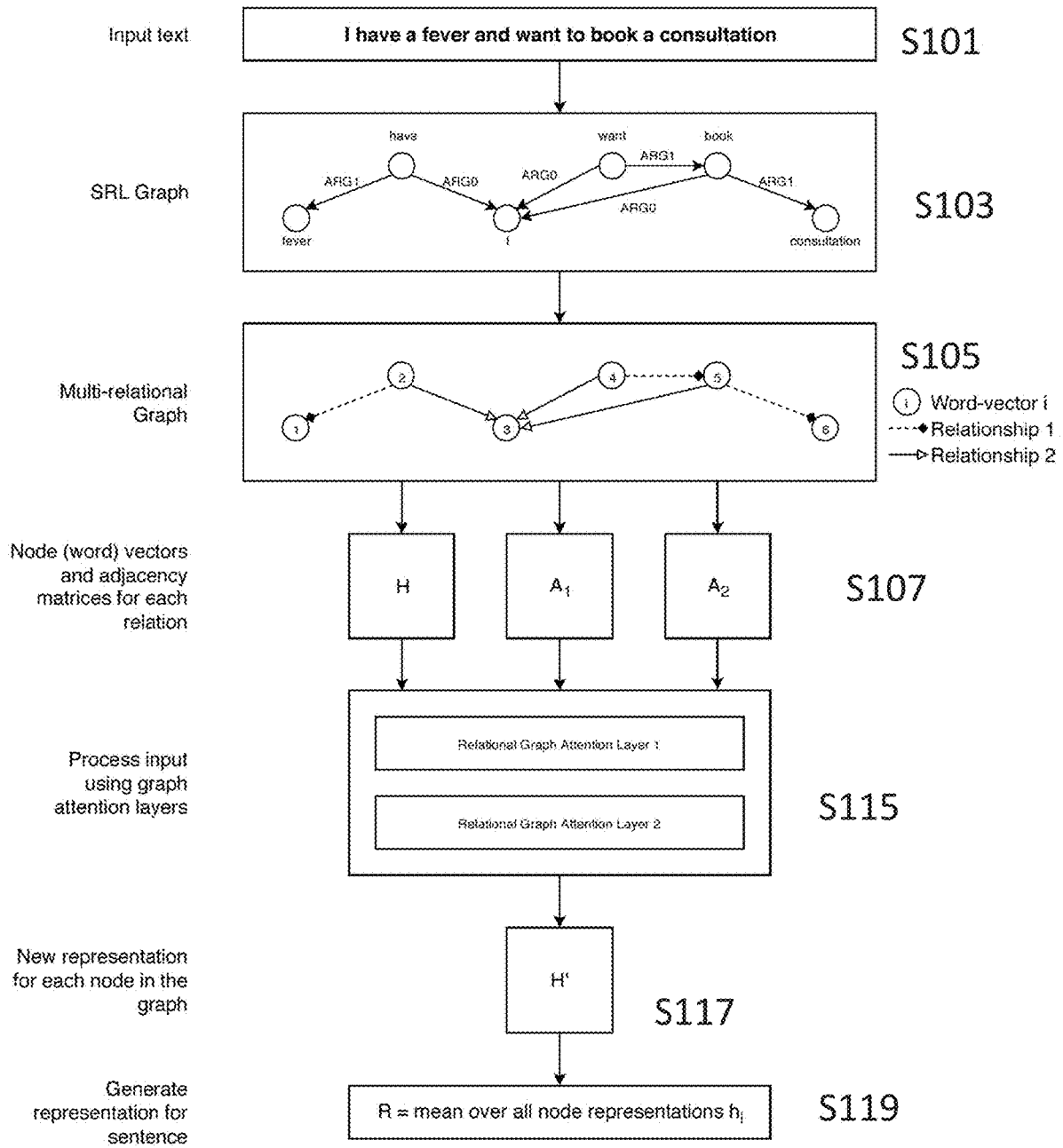
FIG. 2 is a flow chart showing a method in accordance with an embodiment.

FIG. 2 is a flow chart showing a method in accordance with an embodiment. The flow chart can be used to handle a query of the type inputted to the chatbot in FIG. 1.

In step S101, the phrase "I have a fever and want to book a consultation" is input into the chat bot. The result of this embodiment is that the above sentence will be converted to a representation where it is represented in a form which provides a better input for the inference engine.

In step S103, this is then pre-processed using natural language processing systems such as dependency parsers or semantic role labellers to break the input sentence into two branches of information and a more organised order. Specifically, here, the "and" is removed and the two sections of information are connected to the node for "I".

The nature of the relationship between the words is also broken into multiple types. These multiple types correspond to the different relations that will be used later in the RGAT. In this simplified example, only two relationship types are shown which are defined by ProbBank. For example, "ARG0" refers to the "PROTO-AGENT" i.e. the person who has the fever. Details of this labelling can be found in https://web.stanford.edu/~bclevin/lsa09semdetproto.pdf In step S105, the nodes are converted to word vectors (feature vectors). In this simplified example, the feature vector has 6 dimensions and each dimension is allocated to a word in the single phrase. Nodes in this graph are allocated feature representations in order to be consumed by RGAT. This can be done by either using a one-hot representation indicating which word it is, otherwise, standard word representation methods such as GloVe and Word2Vec can assign pre-processed feature vectors to the nodes that already contains semantic information.

In the above, steps S101 to S105 are used together to form the graph that is used as the input for the RGAT.

In step S107, an input layer for the RGAT is created using the feature vectors and the relations between the nodes. The input can be thought of as comprising a matrix H of the feature vectors of the nodes (that will be described below) and information $A_1$, $A_2$ concerning the relation between the nodes for each relation type.

In an embodiment, the input to the layer is a graph with $R=|\mathcal{R}|$ relation types and N nodes. The $i^{th}$ node is represented by a feature vector $h_1$, and the features of all nodes are summarised in the feature matrix $H=[h_1 h_2 \ldots h_N] \in \mathbb{R}^{N \times F}$. The output of the layer is the transformed feature matrix $H'=[h'_1 h'_2 \ldots h'_N] \in \mathbb{R}^{N \times F'}$ where $h'_i \in \mathbb{R}^{F'}$ the transformed feature vector of the $i^{th}$ node.

In this specific example, to construct the feature matrix, each word in the phrase is assigned to a node and a feature vector (word vector) is provided for each node. The feature matrix is then constructed so that each row corresponds to a feature vector for a node. The input layer will be transformed by hidden layers in step S115 to produce output layer H' 117. Two hidden layers are shown in FIG. 2, but 1 layer or more than 2 layers can be used.

It is also possible, if required, to produce a general representation for the whole sentence by, for example, taking the mean over all node representations.

Different relations convey distinct pieces of information. The update rule manifests this by assigning each node i a distinct intermediate representation $g_i^{(r)}$ under relation r.

$$G^{(r)} = HW^{(r)} \in \mathbb{R}^{N \times F'} \quad (1)$$

where $G^{(r)} = [g_1^{(r)} g_2^{(r)} \ldots g_N^{(r)}]$ is the intermediate representation feature matrix under relation r, and $W^{(r)} \in \mathbb{R}^{F \times F'}$ are the learnable parameters of a shared linear transformation.

In an embodiment, it can be assumed that the attention coefficient between two nodes is based only on the features of those nodes up to some neighborhood-level normalization. This leads to a mechanism, termed an attention mechanism a: $\mathbb{R}^{R \times F'} \times \mathbb{R}^{R \times F'} \to \mathbb{R}^R$. Mechanisms considering all relations simultaneously introduce polynomial computational complexity in R and rendering the layer prohibitively slow for most tasks of interest. To keep computational complexity linear in R, in an embodiment, it can be assumed that, given linear transformations $W^{(r)}$, the logits $E_{i,j}^{(r)}$ of each relation r are independent of each other where a here is used to denote a function that enacts the mechanism.

$$E_{i,j}^{(r)} = a(g_i^{(r)}, g_j^{(r)}), \quad (2)$$

and indicate the importance of node j's intermediate representation to that of node i under relation r. The attention is masked so that, for node i, coefficients $\alpha_{i,j}^{(r)}$ exist only for $j \in n_i^{(r)}$ where $n_i^{(r)}$ denotes the set of neighbor indices of node i under relation $r \in \mathcal{R}$. In an embodiment, a specific realization of a in Equation (2) above is given by:

$$E_{i,j}^{(r)} = \text{LeakyReLu}[(a^{(r)})^T(g_i^{(r)} \oplus g_j^{(r)})], \quad (3)$$

where $x^T$ denotes the transpose of x, $a^{(r)} \in \mathbb{R}^{2F'}$ are learnable parameters of the attention mechanism under relation r, and $x \oplus y$ denotes the vector concatenation of x and y.

In an embodiment, softmax is taken over the logits of Equation (3) for each relation type using the below, this will be referred to as WIRGAT (WIthin-Relation type Graph Attention).

$$\alpha_{i,j}^{(r)} = \text{softmax}_j(E_{i,j}^{(r)}) = \frac{\exp(E_{i,j}^{(r)})}{\sum_{k \in n_i^{(r)}} \exp(E_{i,k}^{(r)})}, \forall i, r: \sum_{j \in n_i^{(r)}} \alpha_{i,j}^{(r)} = 1. \quad (4)$$

Figure 3:
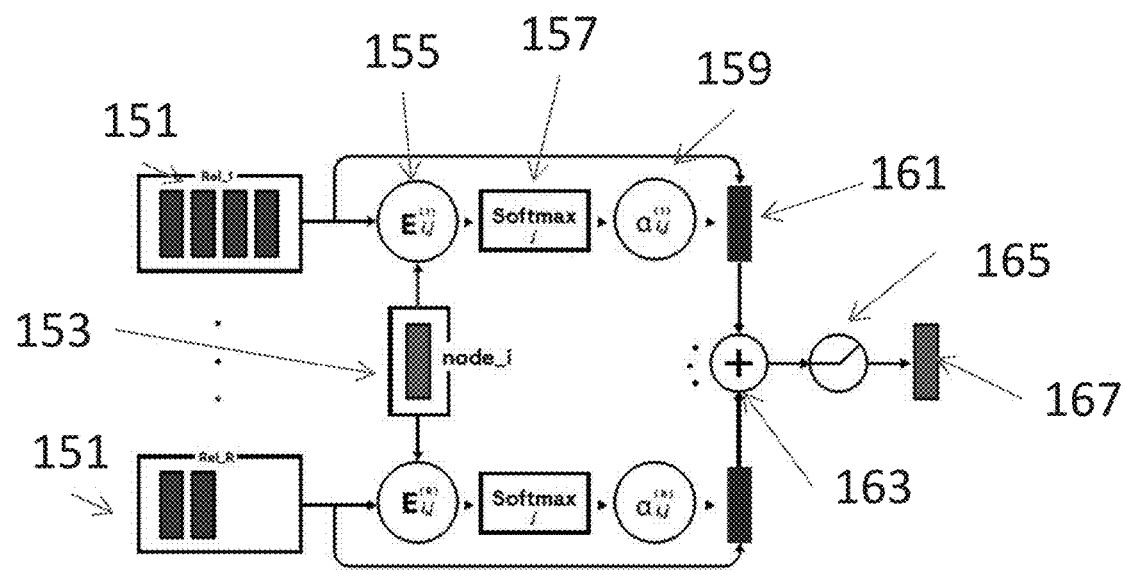
FIG. 3 is a schematic showing an architecture for use in accordance with an embodiment.

This mechanism is shown in FIG. 3 encodes a prior that relation importance is a purely global property of the graph by implementing an independent probability distribution over nodes in the neighborhood of i for each relation r. Explicitly, for any node i and relation r, nodes j, $k \in n_i^{(r)}$ yield competing attention coefficients $\alpha_{i,j}^{(r)}$ and $\alpha_{i,k}^{(r)}$ with sizes depending on their corresponding representations $g_j^{(r)}$ and $g_k^{(r)}$. There is no competition between any attention coefficients $\alpha_{i,j}^{(r)}$ and $\alpha_{i,k}^{(r')}$ for all nodes i and nodes $j \in n_i^{(r)}$, $j' \in n_i^{(r')}$ where $r' \neq r$ irrespective of node representations.

In summary, FIG. 3 shows the architecture of WiRGAT. The intermediate representations for node i 153 are combined with the intermediate representations for nodes in its neighborhood 151 under each relation r, to form each logit $E_{i,j}^{(r)}$ 155. A softmax 157 is taken over each logit matrix 155 for each relation type to form the attention coefficients $\alpha_{i,j}^{(r)}$ 159. These attention coefficients construct a weighted sum 161 over the nodes in the neighborhood for each relation. These are then aggregated 163 and passed through a non-linearity 165 to produce the updated representation for node i 167.

In a further embodiment, an alternative method is provided where the softmax is taken over the logits $E_{i,j}^{(r)}$ across neighbourhoods irrespective of relation type $$\alpha_{i,j}^{(r)} = \underset{j,r}{\text{softmax}}(E_{i,j}^{(r)}) = \frac{\exp(E_{i,j}^{(r)})}{\sum_{r' \in \mathcal{R}} \sum_{k \in n_i^{(r')}} \exp(E_{i,k}^{(r')})}, \quad (5)$$

$$\forall i: \sum_{r \in \mathcal{R}} \sum_{j \in n_i^{(r)}} \alpha_{i,j}^{(r)} = 1.$$

Figure 4:
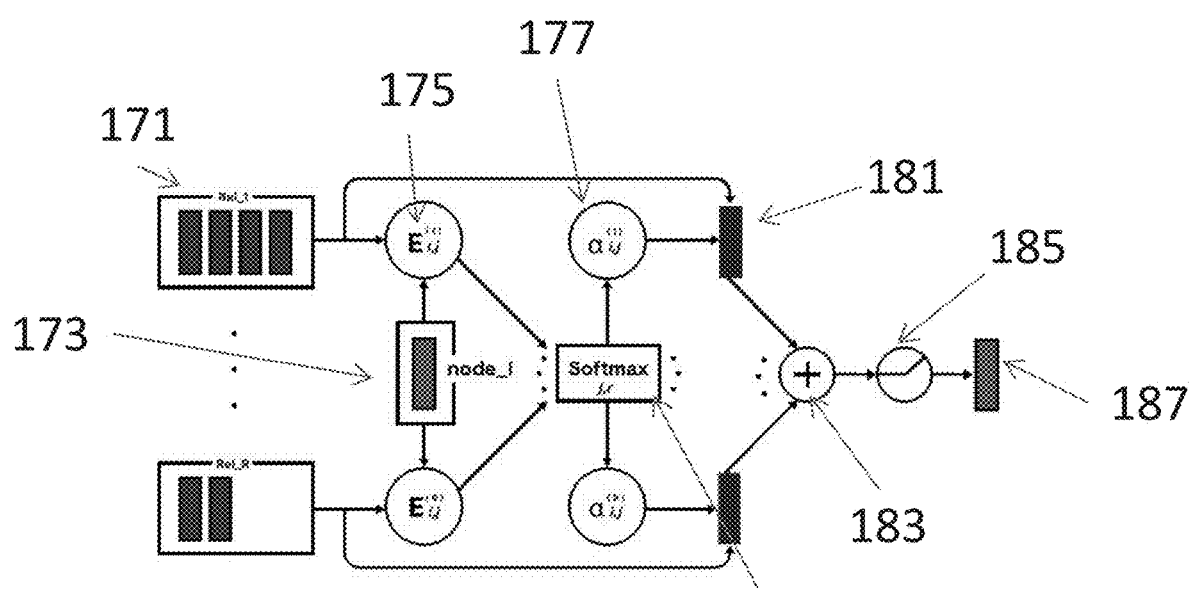
FIG. 4 is a schematic showing an architecture for use in accordance with an alternative embodiment.

The attention mechanism enacted by Equation (5) will be referred to as ARGAT (Across-Relation type Graph Attention). This is shown in FIG. 4. This mechanism encodes the prior that relation importance is a local property of the graph by implementing
a single probability distribution over the different representations $g_j^{(r)}$ for nodes j in the neighborhood of node i. Explicitly, for any node i and all r; $r' \in \mathcal{R}$, all nodes $j \in n_i^{(r)}$ and $k \in n_i^{(r')}$ yield competing attention coefficients $\alpha_{i,j}^{(r)}$ and $\alpha_{i,j}^{(r')}$ with sizes depending on their corresponding representations $g_j^{(r)}$ and $g_k^{(r')}$.

In summary, FIG. 4 shows the architecture of ARGAT. The intermediate representations for node i 173 are combined with the intermediate representations for nodes in its neighborhood 171 under each relation r, to form each logit $E_{i,j}^{(r)}$ 175. A softmax 179 is taken across all logits 175 independent of relation type to form the attention coefficients $\alpha_{i,j}^{(r)}$ 177. These attention coefficients construct a weighted sum 181 over the nodes in the neighborhood for regardless of relation type. These are then aggregated 183 and passed through a nonlinearity 185 to produce the updated representation for node i 187.

To train the network, a back propagation rule needs to be established. In an embodiment, this can be done by performing neighbourhood aggregation over the attention mechanism of either Equation (4) or Equation (5) gives $$h_i' = \sigma\left(\sum_{r \in \mathcal{R}} \sum_{j \in n_i^{(r)}} \alpha_{i,j}^{(r)} g_j^{(r)}\right) \in \mathbb{R}^{N \times F'}, \quad (6)$$

where σ represents an optional nonlinearity.

In a further embodiment, this can be extended to a multi-head attention mechanism that gives a performance boost. In a multi-head attention mechanism, the mechanism can attend to different types of information. This can be done by introducing multiple attention coefficients, e.g. $\alpha_{i,j}^{(r,k)}$ where k is the index of the attention "head". In some embodiments, the WiGAT and ARGAT methods described below can be combined in a multi-head attention mechanism.

$$h_i' = \bigoplus_{k=1}^{K} \sigma\left(\sum_{r \in \mathcal{R}} \sum_{j \in n_i^{(r)}} \alpha_{i,j}^{(r,k)} g_j^{(r,k)}\right) \in \mathbb{R}^{N \times KF'}, \quad (7)$$

where ⊕ denotes vector concatenation, $\alpha_{i,j}^{(r,k)}$ are the normalised attention coefficients under relation r computed by either WiRGAT or ARGAT, and $g_i^{r,k} = h_t(W^{(r,k)})^T$ is the head specific intermediate representation of node i under relation r.

In a further embodiment, a different number of heads for different relationship types can be considered, as well as when a mixture of ARGAT and WiRGAT are used to produce the attention coefficients.

The number of parameters in the RGAT layer increases linearly with the number of relations R and heads K, and can lead quickly to overparameterization. In an embodiment, both the kernels $W^{(r,k)}$ are decomposed as well as the kernels of attention mechanism $\alpha^{(r,k)}$ into Bv basis matrices $V^{(b)} \in \mathbb{R}^{F \times F'}$ and Bv basis vectors $v^{(b)} \in \mathbb{R}^{2F'}$ $$W^{(r,k)} = \sum_{b=1}^{B_W} c_b^{(r,k)} V^{(b)}, \quad a^{(r,k)} = \sum_{b=1}^{B_v} d_b^{(r,k)} v^{(b)}, \quad (8)$$

Where $c_b^{(r,k)}, d_b^{(r,k)} \in \mathbb{R}$ are basis coefficients.

In embodiments, models using full and decomposed Wand a are used.

Figure 5A:
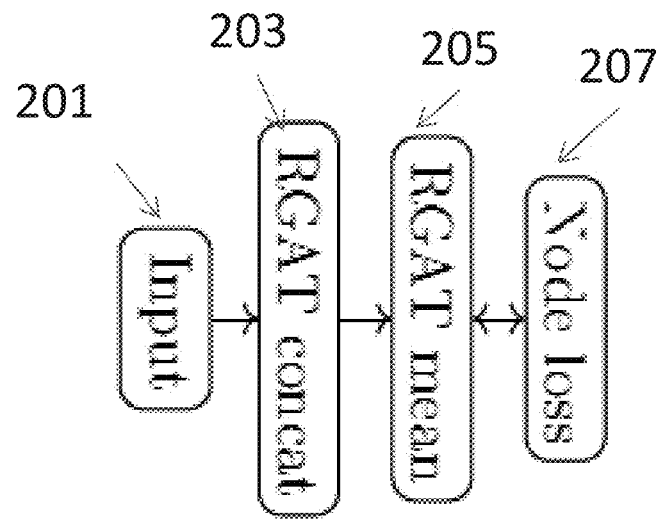
FIG. 5(*a*) is a schematic of a layer architecture in accordance with an embodiment for node classification.

Next, two further applications for the above model will be described:

In an embodiment, for the transductive task of semi-supervised node classification, a two-layer RGAT architecture can be employed as shown in FIG. 5a.

In the node classification task, each node of the input layer has a corresponding node in the output layer. The transformed feature vector will comprise the labels. For example, if there are 10 possible labels, then the transformed feature vector will have 10 dimensions corresponding to the 10 labels. The output feature vector can list probabilities of the node falling within each classification or might simply output a zero to indicate that a label does not apply or a 1 to indicate that a label does apply.

In the specific embodiment discussed here, a multi-head attention mechanism is used. However, a single attention mechanism could also be used.

In this embodiment, the input layer 201, as described above, will be a plurality of nodes with relations therebetween. Each node comprising a feature vector. The nodes could be a range of possibilities, for example, words, entities on a social infrastructure network. Further examples include, text (whose feature vectors could be e.g. vocabulary-one hot representations or word-vectors), the concepts in a knowledge graph (whose feature vectors could be some representation of the properties of those concepts, e.g. an embedding for the labels), atoms in a molecule (whose feature vectors are representations of the atomic properties of those molecules), or the nodes in a probabilistic graphical model (whose feature vectors could be a one-hot representation of their instantiations).

This is then input into RGAT concat layer 203. RGAT concat layer 203 is a layer where the transformed vectors from the different attention coefficients of the multihead attention mechanism are concatenated together. This is then directed into RGAT mean layer 205 where the mean of the transformed vectors from the different attention coefficients of the multi-head attention mechanism are used.

Although, two RGAT layers are used, it should be noted that here, just a single layer could also be used. In this embodiment, a Rectified Linear Unit (ReLU) activation (not shown) is used after the RGAT concat layer, and a node-wise softmax on the final layer to produce an estimate for the probability that the $i^{th}$ label is in the class $$P(\text{class}_i=\alpha)\approx \hat{y}_{i,\alpha}=\text{softmax}(h_i^{(2)})_\alpha. \quad (9)$$

Next, a masked cross-entropy loss $\mathcal{L}$ is employed (as shown in layer 207) to constrain the network updates to the subset of nodes whose labels $\mathcal{Y}$ are known.

$$\mathcal{L} = -\sum_{i\in y}\sum_{\alpha=1}^{n_{classes}} y_{i,\alpha}\ln(\hat{y}_{i,\alpha}), \quad (10)$$

where $y_i$ is the one-hot representation of the true label for node i.

Figure 5B:
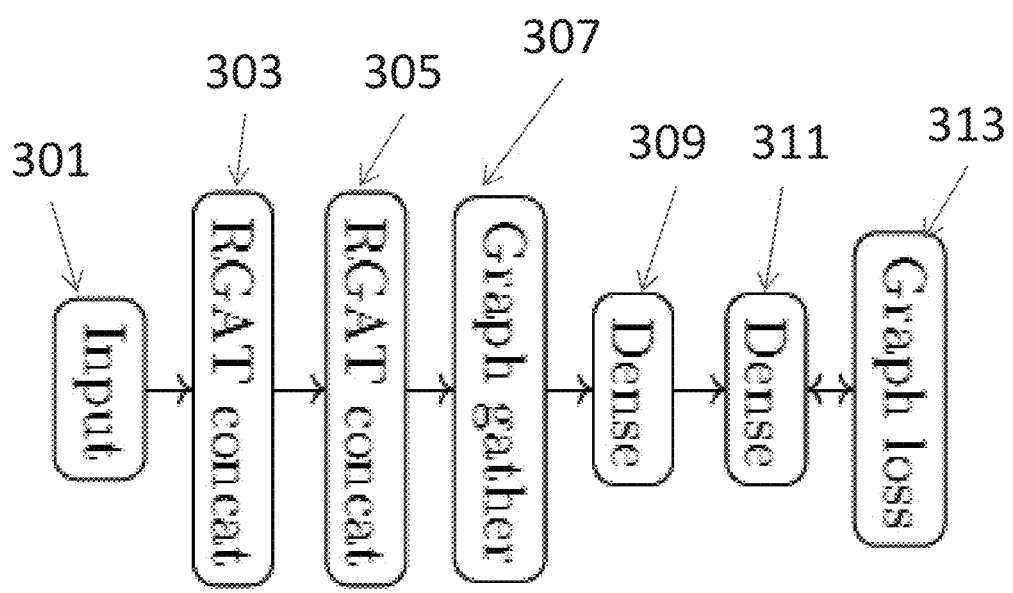

In a further embodiment, for inductive graph classification, a two-layer RGAT is employed followed by a graph gather and dense network architecture shown in FIG. 5(b).

Graph classification is the identification of properties/attributes of part or whole of a graph. One popular example of graph classification is for predicting the properties of certain molecules.

FIG. 5(b) shows a layer structure in accordance with an embodiment. In the specific example, the graph structure relates to molecular structure. The input layer 301 having nodes which define features of the elements of structure and the relations between the nodes are the relations between the elements of structure.

As described above, this specific example is used in a multi-head attention mechanism. However, a single attention mechanism could be used. The input layer is then input into RGAT concat layer 303. RGAT concat layer 303 is a layer where the transformed vectors from the different attention coefficients of the multi-head attention mechanism are concatenated together. This is then directed into RGAT mean layer 305 where the mean of the transformed vectors from the different attention coefficients of the multi-head attention mechanism are used. In both RGAT layers, the number of nodes are kept to be the same as those as the input layer 301.

Next, a graphgather layer 307 is implemented the maths for which will be described below. The GraphGather: $\mathbb{R}^{N\times F} \to \mathbb{R}^{2F'}$, which is given by $$H' = GraphGather(H) = \left(\frac{1}{N}\sum_{i=1}^{N} h_i\right) \oplus \left[\bigoplus_{f=1}^{F} \max_i h_{i,f}\right], \quad (11)$$

and is the vector concatenation of the mean of the node representations with the feature-wise max of the node representations.

Two dense layers 309, 311 then used. However, it is possible to use a single dense layer 311.

The final dense layer then produces logits of the size $n_{classes} \times n_{tasks}$, and a task-wise softmax is applied to its output to produce an estimate $\hat{y}_{t,\alpha}$ for the probability that the graph is in class $\alpha$ for a given task t, analogous to Equation (9).

Weighted cross-entropy loss $\mathcal{L}$ is then used to form the learning objective and is shown as layer 313

$$\mathcal{L}(w, y, \hat{y}) = -\sum_{t=1}^{n_{tasks}}\sum_{\alpha=1}^{n_{classes}} w_{t,\alpha} y_{t,\alpha}\ln(\hat{y}_{t,\alpha}), \quad (12)$$

where $w_{t,\alpha}$ and $y_{t,\alpha}$ are the weights one-hot true labels for task t and class $\alpha$.

Although not shown, ReLU activations are used after after each RGAT layer 303, 305 and the first dense layer 309. A tan h activation is used after the Graphgather layer 307.

In the datasets used, the molecular structures were assessed against 12 tasks, for example, one of the tasks can be toxicity and thus the initial structure that formed the input layer can be labelled.

Further details of the embodiments and the results are to be found in the attached Appendix A which forms part of this application.

Figure 6:
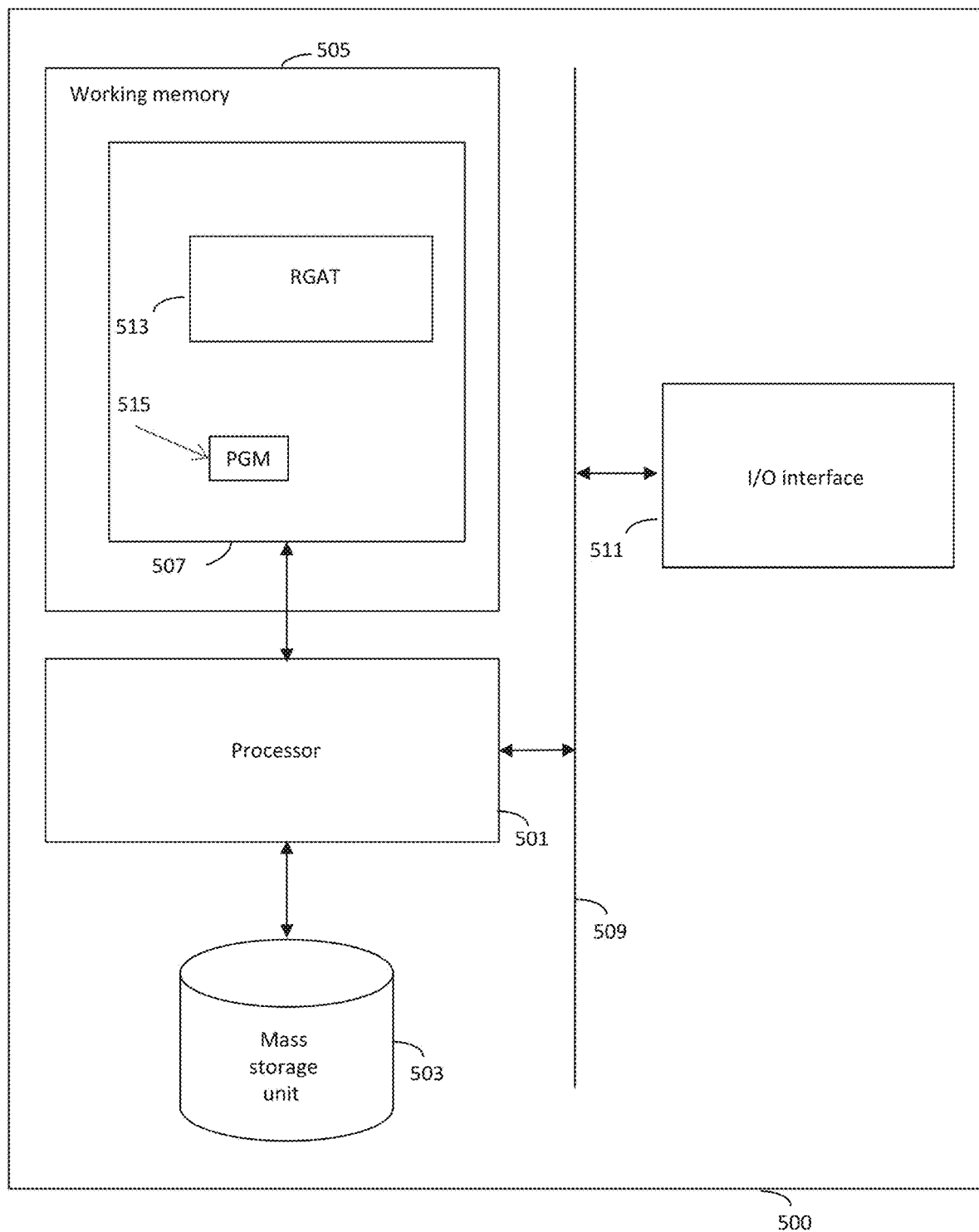
FIG. 6 is a schematic of a system in accordance with a further embodiment.

While it will be appreciated that the above embodiments are applicable to any computing system, an example computing system is illustrated in FIG. 6, which provides means capable of putting an embodiment, as described herein, into effect. As illustrated, the computing system 500 comprises a processor 501 coupled to a mass storage unit 503 and accessing a working memory 505. As illustrated, a neural net with an RGAT layer 513 is represented as software products stored in working memory 505. However, it will be appreciated that elements of the neural net with an RGAT layer 513, for convenience, be stored in the mass storage unit 503. Depending on the use, the RGAT layer 513 may be used with a probabilistic graphical model (PGM) 515, in this embodiment resides with a PGM that serves as a diagnostic engine that can provide a response to a user provided via the neural net with an RGAT layer.

Usual procedures for the loading of software into memory and the storage of data in the mass storage unit 503 apply. The processor 501 also accesses, via bus 509, an input/output interface 511 that is configured to receive data from and output data to an external system (e.g. an external network or a user input or output device). The input/output interface 511 may be a single component or may be divided into a separate input interface and a separate output interface.

Thus, execution of the neural net with an RGAT layer 513 by the processor 501 will cause embodiments as described herein to be implemented.

The neural net with an RGAT layer 513 can be embedded in original equipment, or can be provided, as a whole or in part, after manufacture. For instance, the neural net with an RGAT layer 513 can be introduced, as a whole, as a computer program product, which may be in the form of a download, or to be introduced via a computer program storage medium, such as an optical disk. Alternatively, modifications to existing neural network software can be made by an update, or plug-in, to provide features of the above described embodiment.

The computing system 500 may be an end-user system that receives inputs from a user (e.g. via a keyboard) and retrieves a response to a query using a PGM 515 in contact with a neural net with an RGAT layer adapted to produce the user query in a suitable form for the PGM. Alternatively, the system may be a server that receives input over a network and determines a response. Either way, the use of the RGAT layer may be used to determine appropriate responses to user queries, as discussed with regard to FIG. 1.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of methods and systems described herein may be made without departing from the spirit of the inventions. The accompanying claims and their equivalents are intended to cover such forms of modifications as would fall within the scope and spirit of the inventions.

The invention claimed is:

1. A computer implemented method of mapping a first graphical data structure representation to a second graphical data structure representation, the first graphical data structure representation comprising nodes, with at least one of a plurality of relations between said nodes, the second graphical data structure representation comprising nodes, the mapping comprises using an attention mechanism, wherein said attention mechanism establishes the importance of specific nodes dependent on their neighbourhood and the relations between the nodes, wherein the attention mechanism is enacted by attention coefficients and there is a coupling between attention coefficients across different relations.

2. The method of claim 1, wherein the attention coefficients across a neighbourhood are normalised.

3. The method of claim 1, wherein the attention coefficients across a neighbourhood of nodes for one relation are normalised.

4. The method of claim 1, wherein the nodes of the first graphical data structure representation each comprise a feature vector and the nodes of the second representation also each comprise a feature vector, the mapping converting the features of the feature vectors of the first graphical data structure representation into transformed feature vectors of the second graphical data structure representation.

5. The method of claim 4, wherein the feature vectors of the first graphical data structure representation are transformed into feature vectors of the second graphical data structure representation via a linear transformation and an attention mechanism.

6. The method of claim 5, wherein the attention mechanism is configured such that after the linear transformation, the relation between the linearly transformed feature vectors are independent of other relations.

7. The method of claim 6, wherein the attention mechanism comprises attention coefficients derived from a product of a relation dependent vector with a concatenation of two related nodes where the feature vectors from the two related nodes have been transformed via said linear transformation.

8. The method of claim 7, wherein the attention coefficients are derived from the said product using an activation function that allows normalisation over the neighbourhood of nodes.

9. The method of claim 5, wherein matrices that define the linear transformation and the attention mechanism are decomposed.

10. The method of claim 1, where the attention mechanism is a multi-head attention mechanism.

11. A natural language processing method, adapted to map an input phrase into a form more suitable for a query, the method comprising:
converting the input phrase into a first graphical data structure representation, wherein the words of the input phrase are converted into feature vectors and the semantic relationships between the words provide a plurality of relations between the feature vectors;
mapping said first graphical data structure representation into a second graphical data structure representation wherein the mapping comprises using an attention mechanism, said attention mechanism establishes the importance of specific feature vectors dependent on their neighbourhood and the relations between the feature vectors.

12. A computer implemented classification method, for classifying entities, said entities being defined by feature vectors and having relations between the entities, the method comprising:
representing the feature vectors and relations as a first graphical data structure representation,
mapping said first graphical data structure representation into a second graphical data structure representation wherein the mapping comprises using an attention mechanism, said attention mechanism establishes the importance of specific feature vectors dependent on their neighbourhood and the relations between the feature vectors, said mapping transforming the feature vectors of the first graphical data structure representation to transformed feature vectors in the second graphical data structure representation wherein the transformed feature vectors of said second graphical data structure representation represent classes.

13. A system for mapping a first graphical data structure representation to a second graphical data structure representation, the system comprising a processor and a memory, the processor being configured to:
receive a first graphical data structure representation comprising nodes, with at least one of a plurality of relations between said nodes,
retrieve from memory a pre-trained model adapted to map said first graphical data structure representation to a second graphical data structure representation, wherein the pre-trained model uses an attention mechanism, wherein said attention mechanism establishes the importance of specific nodes dependent on their neighbourhood and the relations between the nodes; and
map the first graphical data structure representation to a the second graphical data structure representation.

14. The system of claim 13, wherein the first processor comprises a GPU.

\* \* \* \* \*